INVENTOR.
GEORGE L. WALTHER
JACOB KOORNEEF
JULES BOS
BY
F. P. Trifari
AGENT

INVENTOR.
GEORGE L. WALTHER
JACOB KOORNEEF
JULES BOS
BY
K. R. Trifari
AGENT

United States Patent Office 3,474,528

Patented Oct. 28, 1969

3,474,528

METHOD OF MANUFACTURING A FLUX-SENSITIVE MONO- OR MULTI-TRACK MAGNETIC HEAD

George Ludwig Walther, Jacob Koorneef, and Jules Bos, Emmasingel, Eindhoven, Netherlands, assignors, by mesne assignments, to U.S. Philips Corporation, New York, N.Y., a corporation of Delaware Filed Dec. 28, 1966, Ser. No. 605,382
Claims priority, application Netherlands, Jan. 18, 1966, 6600603
Int. Cl. B23q *17/00;* H01f *7/06*
U.S. Cl. 29—603 2 Claims

ABSTRACT OF THE DISCLOSURE

A method of manufacturing a flux sensitive multi-track magnetic head including the steps of ultrasonically drilling auxiliary and lead-in holes in alternate rows, into a block of magnetic material, cutting a first kerf set partway through the block along each auxiliary hole, filling the first kerf set with non magnetic material, completing the kerf cut with a second kerf set filling the second kerf set with non magnetic material, and placing U-shaped pole piece on each section defined by the kerfs.

The invention relates to a method of manufacturing a flux-sensitive mono- or multi-track magnetic head for scanning signals on a magnetizable carrier. The head is constructed from a substantially annular magnetizable body which comprises an effective gap and one or more reading windings, a magnetically balanced auxiliary winding through which a varying current flows being arranged around part of the body by means of one or more lead-in holes.

For reading, that is to say indicating the intensity and the direction of magnetization of magnetic recordings on a carrier by means of magnetic heads, it is necessary that in the magnetizable circuit of the head varying magnetic flux is produced. This varying flux induces a voltage in the reading winding(s) arranged around the circuit, which is proportional to the flux-variation $d\phi/dt$.

The varying flux in the circuit may be produced, for example, by moving the record carrier along a gap in the circuit. However, as the speed of this relative movement decreases, the flux variation and consequently the induced voltage in the reading winding(s) are reduced so that the reading process is impeded. If it is the object to read magnetic recordings on a carrier which does not move relative to the head, the said method cannot be used at all.

However, magnetic heads are known which can read magnetic recordings where no relative movement of the carrier with respect to the head takes place. Such heads, for example, the so-called modulating heads, may be provided with auxiliary means with which the magnetic reluctance of the magnetic circuit of the head, or a part thereof, can be varied.

A known auxiliary means is an auxiliary winding which envelopes part of the magnetic circuit and through which a varying current flows, for example an alternating current having a frequency in the order of 1 mc./s. The magnetic reluctance in the enveloped part of the circuit, that is to say the magnetic permeability of that part, then varies.

When using such an auxiliary winding it should be ensured that the magnetic auxiliary flux produced therein by the varying current is restricted to a part of the total magnetic head circuit and does not penetrate to the effective gap. For this purpose a magnetically balanced winding is used, that is to say, a winding which is arranged in such manner that the auxiliary flux occurring experiences an equal magnetic resistance to the exterior on all sides of the part of the circuit in which that flux is to occur.

Magnetically balanced auxiliary windings are known. According to a known construction two lead-in holes for that winding are arranged in the main circuit, the axes of which extend in the direction of the width of the gap and which are each arranged approximately symmetrically with respect to the boundary surfaces of the part of the circuit in question, between said surfaces. As a result of the requirement that the winding be balanced, very high requirements are imposed upon the accurate positioning of the lead-in holes with respect to the said boundary surface.

A known method of correctly positioning the lead-in holes is that, first, the lead-in holes are provided in the desired part of the circuit, then the boundary surfaces of the part of the circuit are roughly formed. Finally the boundary surfaces are accurately ground and polished to the desired positionings. A drawback of this method is that it is difficult to reach the desired accuracy (10 microns) by means of the known grinding and polishing methods. As a result of this, the foregoing method is very time-consuming and even entirely unsuitable for mass production.

According to the invention the above drawback is mitigated and the method according to the invention is characterized in that both one or more lead-in holes and on either side of a lead-in hole an auxiliary hole are provided in a block of magnetizable material in one ultrasonic drilling operation. In the finished head a part of the wall of said auxiliary holes is located in the boundary surfaces of the part in which the auxiliary flux occurs, and the magnetic head then completed by means of the resulting part and a pole shoe unit.

In fact, it is possible by means of the aforementioned drilling method—once the drilling jig used, accurately, has the desired shape—to obtain a drilling result within the required tolerances. If, after drilling the holes, the boundary surfaces of the part of the circuit in question are provided so that they extend through the auxiliary holes, in other words, that the boundary surfaces are interrupted by the auxiliary holes, the lead-in hole(s) in the part of the circuit in question will always be correctly positioned. This method provides the significant advantage that, with respect to the sawing operation for providing the boundary surfaces of the part of the circuit, no great accuracy is required any longer. If only the cutting kerfs extend through the auxiliary holes, the requirements imposed will always be met.

If, as in a known construction, the lead-in holes are arranged so that their axes extend parallel to the direction of the width of the gap, an additional difficulty occurs. In fact, if these lead-in holes are arranged exactly centrally of the part of the circuit, that is to say that above and below these holes equally proportioned members of magnetizable material are arranged, the magnetic resistance in the main circuit for the auxiliary flux occurring in the part of the circuit in question, viewed from that part of the circuit, will be different in accordance with the path which is followed by the main circuit (for example, the outer ring as against the inner ring). It therefore will be necessary not to position the lead-in holes exactly symmetrically relative to the boundary surfaces of the part of the circuit but a little dissymmetrically. It will be clear that this involves additional difficulties structurally.

According to an embodiment of the invention the drawbacks of such a dissymmetrical arrangement of the lead-in holes in the main circuit can be avoided by arranging the auxiliary holes with their axes at right angles to the width of the gap. In such an arrangement the difficulties occurring in providing the above-mentioned dissymmetrical lead-in holes are avoided since in this case a symmetrical arrangement has to be chosen; viewed from points which are located symmetrically in the part of the circuit covered by the auxiliary flux with respect to the lead-in holes, the magnetic resistance for each "ring" in the main circuit is equal.

In order to realize the required positioning more easily it is of advantage to give the lead-in hole(s) and the auxiliary holes such a shape that a cross section at right angles to the axis is rectangular.

The invention also relates to a method of manufacturing a multi-track flux-sensitive magnetic head which is characterized in that in a surface of a block of magnetizable material, which is preferably rectangular; one or more, preferably parallel, rows of alternate lead-in holes and auxiliary holes are drilled to the desired depth. The block is then given a U profile by removing material from the oppositely located surface in such manner that the holes are located only in the bridge joining the limbs of the U. The limbs of the U are then sawn from the same side along surfaces which extend through the elongated auxiliary holes, the cutting kerfs next being filled with a non-magnetizable material adhering to the magnetizable material. Finally, cutting kerfs are provided in the elongation of said cutting kerfs starting from the bridge joining the limbs of the U which empty into the filled first cutting kerfs, the cutting kerfs being preferably filled with a non-magnetizable material after which in known manner the finished pole shoe units are secured to the part of the head thus obtained.

The great advantage of this latter method is that in this manner a multi-track head can be manufactured in which one piece of magnetizable material is used as the starting material in which, in spite of the various operations to which it has been subjected, including that of providing screenings between the tracks, the material cohesion in the material is maintained from the first to the last operation.

Another method of manufacturing a multi-track flux-sensitive magnetic head is characterized in that one or more alternate lead-in holes and auxiliary holes are drilled to the desired depth in a surface of a, preferably rectangular, block of magnetizable material. The block is then laid, with the apertures of the holes downwards, in the frame of a holder preferably consisting of ceramic material and secured by means of a cement, the upper side of the block being then ground flat or profiled, if desired. The block and the frame are then sawn along surfaces through corresponding auxiliary holes and to such a depth that only the block is cut by sawing, after which the head is completed by means of a winding(s) and a pole shoe unit which is secured to the parts of the block and the head is then removed from the holder.

Because the block of magnetizable material is cemented in the holder (which consists, for example, of white ceramic) and is removed only after the head is completed, the operations to which the block is subjected after inserting into the holder will not influence the mutual position of the holes and the distance between the tracks.

The invention also relates to a magnetic head manufactured by one or more of the above methods.

In order that the invention may readily be carried into effect it will now be described in greater detail, by way of example, with reference to the accompanying drawings which show embodiments of the method according to the invention and in which FIGURE 1 shows a modulating magnetic head in which the lead-in holes for the auxiliary winding are arranged parallel to the width of the gap;

FIGURE 2 also shows a modulating magnetic head in which, however, the lead-in holes for the auxiliary winding are arranged at right angles to the width of the gap;

Figures 3, 4, 5:
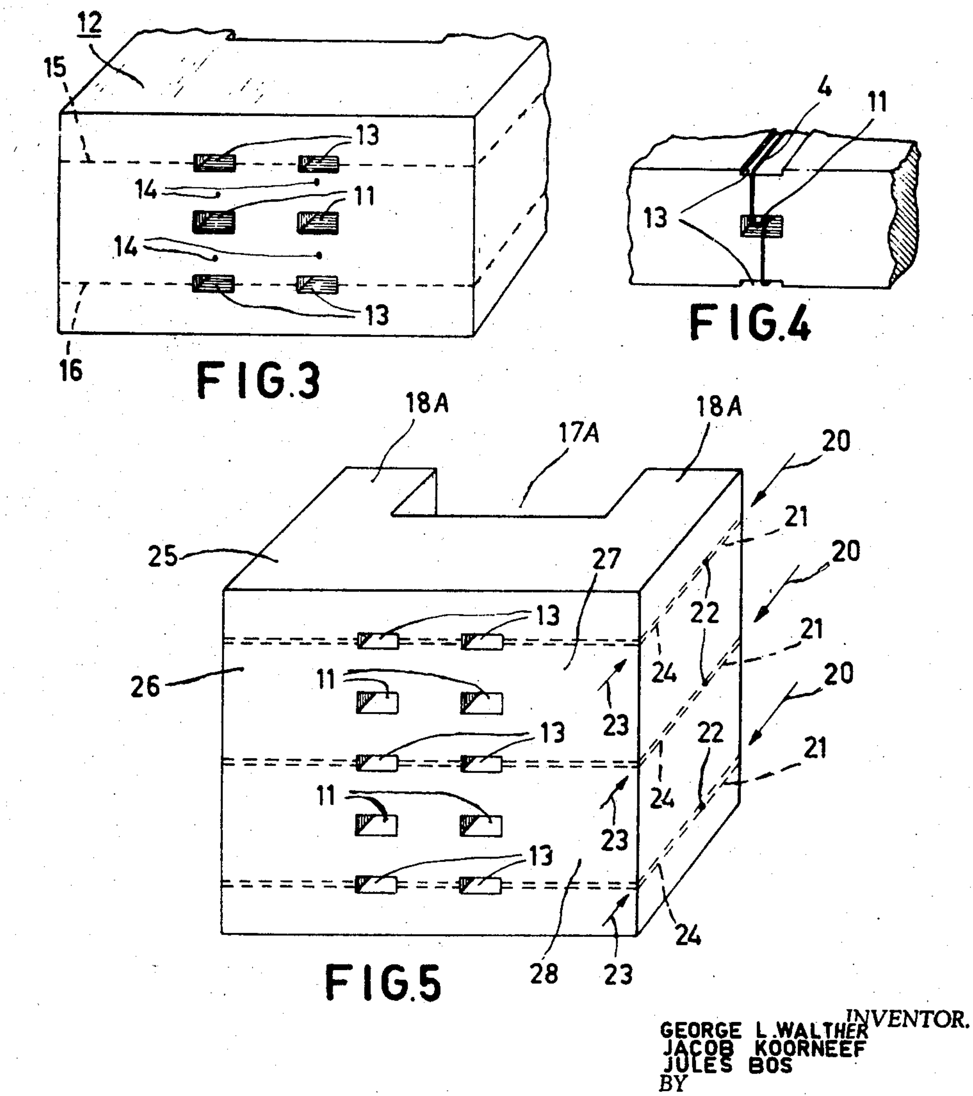
FIGURE 3 is an isometric side elevation of the rear portion of the magnetic circuit shown in FIGURE 2 in a stage of the manufacture.
FIGURE 4 is an isometric side elevation of a finished rear portion of a magnetic head circuit provided with only one lead-in hole for the auxiliary winding in which also the auxiliary winding is diagrammatically shown.
Figure 6:
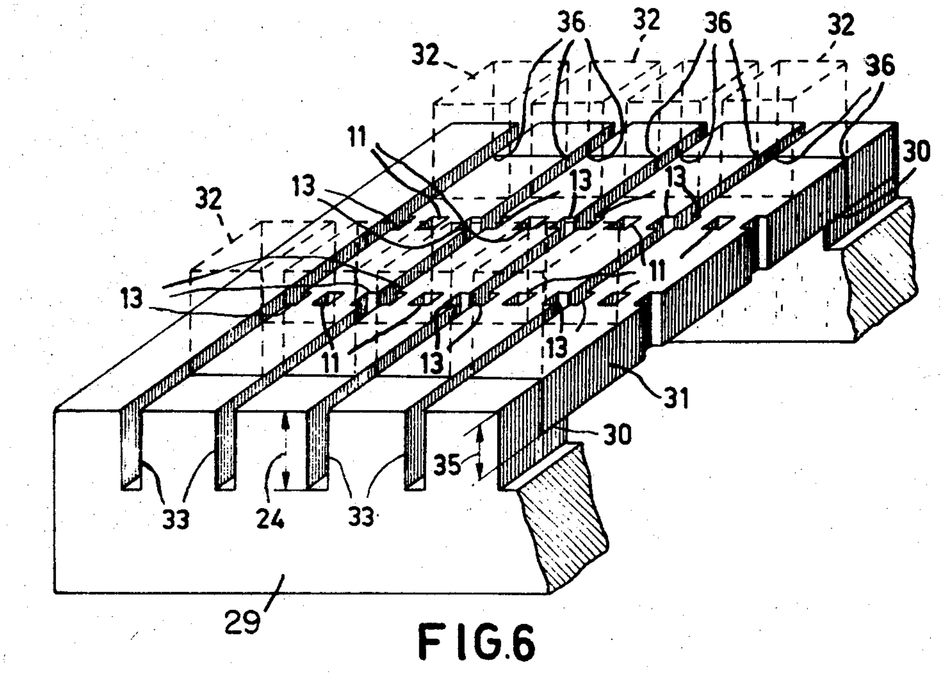
Figure 7:
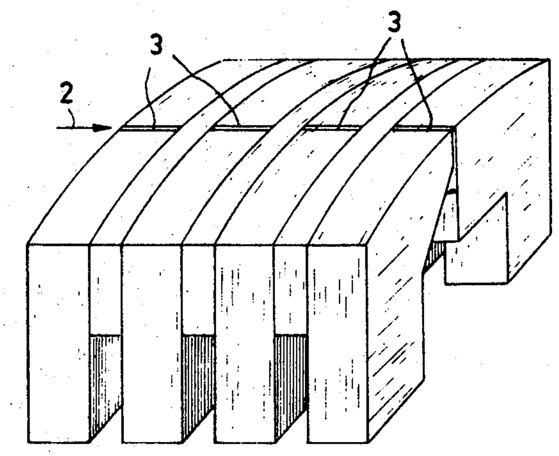

FIGURES 5 and 6 are isometric side elevations of the rear portion of a multi-track modulating magnetic head in a stage of the method as claimed in claims 4 and 5, respectively, and FIGURE 7 shows a finished pole shoe unit for a multitrack magnetic head.

Figure 1:
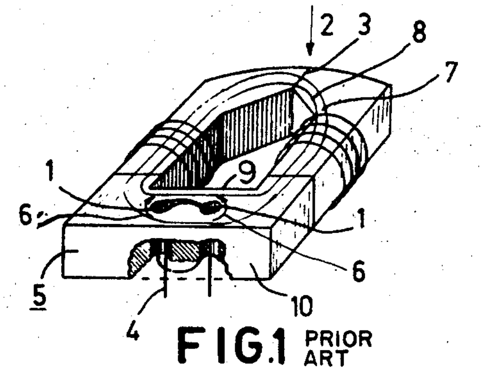
FIG.1 PRIOR ART

The modulating head as shown in FIGURE 1 comprises circular lead-in holes 1 the axes of which extend parallel to the width 2 of the gap 3. A winding 4 is threaded through these holes through which during operation a varying current will flow as a result of which a part of the rear portion 5 of the head will show an always varying magnetic saturation degree as a result of the varying magnetic flux occurring. Dependent upon the direction of flow the direction of the flux produced by the auxiliary winding 4 will be as shown by the arrows 6 or opposite.

The winding 4 threaded through the holes 1 is balanced, which means that the auxiliary flux in the region around the lead-in holes does not penetrate into the main circuit and consequently in the gap 3. Since in the case of a symmetrical arrangement of the holes 1 relative to the boundary surfaces 9 and 10 of the rear portion 5 the paths 7 and 8 to be followed by the flux are different, as far as the total magnetic reluctance is concerned, a part of the auxiliary flux will penetrate into the main circuit in such an arrangement. This can be prevented by a dissymmetrical arrangement of the lead-in holes 1. This must be done with a very great accuracy.

Figure 2:
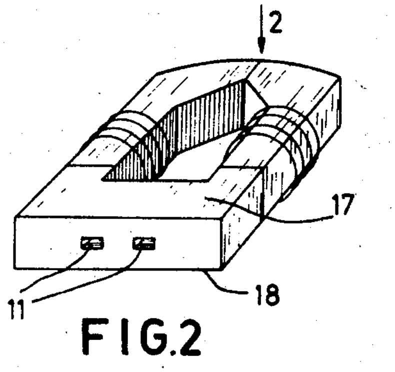

In FIGURE 2 the lead-in holes 11 are arranged so that their axes extend at right angles to the width of the gap 2. In this case the holes 11 must be symmetrical with respect to the boundary surfaces 17 and 18. Such a configuration can more easily be realized structurally.

It is shown in FIGURE 3 how in the case of FIGURE 2 (but the method of the hole position of FIGURE 1 may analogously be used) the lead-in holes 11 are arranged.

The hole pattern as shown is drilled into the black 12 by an ultrasonic drilling operation. This hole pattern comprises the lead-in holes 11 and the auxiliary holes 13. The block 12 is then cut by sawing along the dotted lines 15 and 16 extending through the auxiliary holes 13. These cutting kerfs 15 and 16 constitute the boundary surfaces 17 and 18 in FIGURE 2.

Since it is possible, by means of an ultrasonic drilling operation, to make the proportions of the pieces of material 14 of the rear portion which, after drilling, are present between the lead-in holes 11 and the auxiliary holes 13, equal with a tolerance of $10_2\mu$ and since the proportions of said pieces 14 are decisive for the required magnetic balance, the requirements necessary for reaching a magnetic balance will always be fulfilled without special measures needing to be taken with respect to the provision of the cutting kerfs 15 and 16.

Alternatively it is possible to provide a balanced winding by using only one lead-in hole 11. It is shown in FIGURE 4 how in that case the winding 4 should be provided in the form of an 8. The magnetic balance is also reached when using one lead-hole 11 by using auxiliary holes 13.

FIGURE 5 shows how a flux-sensitive multi-track magnetic head can easily be manufactured by means of the method described. Starting material is a block, preferably rectangular, of magnetizable material 25. In one of the surfaces thereof one or two rows of alternatively lead-inholes 11 and auxiliary holes 13 are drilled by means of an ultrasonic drilling operation. This also is effected again in one operation. From the oppositely located surface, material 17A is then removed so that a U profile is formed having limbs 18A and a bridge 19 between the limbs.

In this method it is ensured that the holes 11 and 13 are drilled through the hole bridge 19 joining the limbs 18A and that they are located entirely in that bridge 19, that is to say, that they open between the limbs 18A of the U. In order to ensure uniformity for all the tracks the rows of holes will preferably be chosen to be parallel.

The limbs 18A are then sawn in the direction of the arrows 20. The cutting kerfs 21 are located in surfaces which extend through the auxiliary holes 13 and are provided up to a depth 22 which is previously chosen. The cutting kerfs 21 are then filled with non-magnetizable material.

Then the sawing operation is carried out from the oppositely located surface, that is to say from the base 26 of the bridge 19 in the direction of the arrows 23 in a manner such that the resulting cutting kerfs 24 extend in the elongation of the cutting kerfs 21 are already provided and filled and extend into the latter. These latter cutting kerfs 24 also are filled with non-magnetizable material.

The result is that in this manner single circuit parts 27 and 28 separated by non-magnetizable material are obtained while nevertheless the material cohesion present in the block 25 used as the starting material between the circuit parts 27 and 28 existing for various tracks was maintained so that the distance between the individual circuits and consequently the distance between the tracks is accurately defined. This latter is of great importance in particular in connection with the exchangeability of multi-track heads.

By providing each U circuit part 27, 28 with a pole shoe unit, that is to say, a member which comprises an effective gap, the individual magnetic head circuits are completed. The members for the various circuit parts may be combined, if required, to form a composite member as shown in FIGURE 7. When the circuits are thus closed, a multiple flux-sensitive magnetic head is obtained.

A second method of manufacturing a flux-sensitive multi-track magnetic head is now described with reference to FIGURES 6 and 7.

In FIGURE 6, 29 denotes a holder which consists, for example, of white ceramic. Such a holder comprises a frame in which a block 31 consisting of a material of which the magnetic head circuit will consist can be laid on projecting edges 30. The lead-in holes 11 and the auxiliary holes 13 are provided in that block 31 in the manner described above before it is laid in the holder 29. The block 31 is cemented in the holder by means of, for example, araldite. The block is then ground flat on its upper side. The holes drilled in the block 31 must at least have such a depth that after grinding the block 31 flat the holes extent throughout the remaining portion of the block.

Instead of grinding flat the upper side of the block 31 it is alternatively possible to give the block a U profile as denoted by 32 (broken lines).

When the upper part of the block 31 has been given the desired shape it is sawn from the upper side along the kerfs 33. The depth 34 of said kerfs must be larger than the thickness 35 of the part of the block 31 remaining after profiling. So this part will be cut entirely. According to the method already described the cutting kerfs 33 extend through associated auxiliary holes 13. The depth of the cutting kerfs 33 will have to be such that the holder 29 is not separated by sawing. This means that after the kerfs 33 are provided the separated parts 36 are not displaced relative to one another by the grinding and sawing operations. The resulting parts 36 can each serve as a rear portion of one magnetic circuit in the multi-track head. If a finished pole shoe unit as shown in FIGURE 7 is cemented on the juxtaposed rear portions 36 after coils are provided around the circuit parts and one or more auxiliary windings are threaded through the lead-in holes 11, a multi-track magnetic head is obtained.

What is claimed is:

1. A method of manufacturing a multi-track flux-sensitive magnetic head with a read winding and with a magnetically balanced auxiliary winding for each track, comprising the steps of ultrasonically drilling into a surface of a block of magnetizable material a plurality of alternate rows of lead-in holes and auxiliary holes at a desired depth, rendering said block into a U profile by removing material from the oppositely located surface of said block such that said holes extend in the bridge joining the limbs of the U, sawing the limbs of the U into cutting kerfs from the same surface along subsurfaces which extend through said auxiliary holes, filling said cutting kerfs with a non-magnetizable material adhering to the magnetizable material, providing further cutting kerfs along said filled cutting kerfs starting from the bridge joining the limbs of the U, said further kerfs forming an opening in said filled cutting kerfs, filling said further cutting kerfs with a non-magnetizable material, and securing finished pole shoe units to the resulting composed head part.

2. A method of manufacturing a multitrack flux sensitive magnetic head with a read winding and with a magnetically balanced auxiliary winding for each track, comprising the steps of ultrasonically drilling alternating rows of auxiliary and lead-in holes into one surface of a block of magnetizable material for accommodating said auxiliary winding, sawing a first set of kerfs partway through said block along each plane extending through each auxiliary hole, filling said kerf with non magnetic material, sawing a second set of kerfs through the remaining material of said block along each plane of each of the first set of kerfs, filling said second set of kerfs with non magnetic materials and providing a U-shaped circuit part containing an effective gap for each separate segment formed by said kerfs.

References Cited

UNITED STATES PATENTS

| | | | |
|---|---|---|---|
| 2,870,267 | 1/1959 | Duinker et al. | 179—100.2 |
| 3,167,752 | 1/1965 | Warmen et al. | 179—100.2 X |
| 3,224,073 | 12/1965 | Peloschek | 29—603 |
| 3,237,281 | 3/1966 | Antonson | 29—583 X |
| 3,239,916 | 3/1966 | Love | 29—414 X |
| 3,254,400 | 6/1966 | Gordon | 29—413 |
| 3,353,261 | 11/1967 | Bradford et al. | 29—603 |

JOHN F. CAMPBELL, Primary Examiner

C. E. HALL, Assistant Examiner

U.S. Cl. X.R.

29—413, 414; 179—100.2